(12) United States Patent
Liu

(10) Patent No.: US 8,320,472 B2
(45) Date of Patent: Nov. 27, 2012

(54) METHOD FOR EFFICIENT FEEDBACK OF RECEIVING CHANNEL CONDITIONS IN ADAPTIVE VIDEO MULTICAST AND BROADCAST SYSTEMS

(75) Inventor: Hang Liu, Yardley, PA (US)

(73) Assignee: Thomson Licensing, Issy les Moulineaux (FR)

( * ) Notice: Subject to any disclaimer, the term of this patent is extended or adjusted under 35 U.S.C. 154(b) by 571 days.

(21) Appl. No.: 12/449,807

(22) PCT Filed: Mar. 9, 2007

(86) PCT No.: PCT/US2007/006014
§ 371 (c)(1),
(2), (4) Date: Aug. 27, 2009

(87) PCT Pub. No.: WO2008/111930
PCT Pub. Date: Sep. 18, 2008

(65) Prior Publication Data
US 2010/0098176 A1    Apr. 22, 2010

(51) Int. Cl.
*H04B 7/00* (2006.01)
(52) U.S. Cl. .......................................... 375/259; 455/69
(58) Field of Classification Search .................. 375/259; 455/69
See application file for complete search history.

(56) References Cited

U.S. PATENT DOCUMENTS

| | | | |
|---|---|---|---|
| 6,993,689 B2 | 1/2006 | Nagai et al. | |
| 7,522,935 B2 | 4/2009 | Rey et al. | |
| 7,627,184 B2 | 12/2009 | Dei et al. | |
| 2003/0112996 A1* | 6/2003 | Holliman et al. | 382/100 |
| 2004/0160938 A1 | 8/2004 | Lee et al. | |

FOREIGN PATENT DOCUMENTS

| | | |
|---|---|---|
| EP | 1624610 | 2/2006 |
| EP | 1631000 | 3/2006 |
| EP | 1860796 A1 | 11/2007 |
| JP | 2000151499 A2 | 5/2000 |

(Continued)

OTHER PUBLICATIONS

Vieron et al., "Source and Channel Adaptive Rate Control for Multicast Layered Video Transmission Based on a Clustering Algorithm". EURASIP Journal on Applied Signal Processing, Feb. 1, 2004, pp. 158-175.

(Continued)

*Primary Examiner* — Shuwang Liu
*Assistant Examiner* — Michael Neff
(74) *Attorney, Agent, or Firm* — Robert D. Shedd; Jeffrey M. Navon; Catherine A. Cooper

(57) ABSTRACT

A method and apparatus for providing channel condition feedback in a multicast network are described including estimating a indication of channel condition, determining a receiver class based on the estimated indication of channel condition, calculating a delay, delaying transmission of the estimated indication of channel condition for the calculated delay, receiving a report from another receiver in the determined receiver class, the report including an indication of channel condition and canceling the delay if the received indication of channel condition is one of greater than and equal to the estimated indication of channel condition. The method and apparatus further include transmitting a single report for the calculated receiver class to a server including a worst indication of channel condition for the determined receiver class.

16 Claims, 4 Drawing Sheets

FOREIGN PATENT DOCUMENTS

| | | |
|---|---|---|
| JP | 2002204278 A | 7/2002 |
| JP | 2008509582 A | 3/2008 |
| WO | 2005050346 A2 | 6/2005 |
| WO | 2006106692 A1 | 10/2006 |
| WO | WO 2006121493 | 11/2006 |

OTHER PUBLICATIONS

Chesterfield et al., "An Extensible RTCP Control Framework for Large Multimedia Distributions". Proceedings of the Second IEEE International Symposium on Network Computing and Applications, Apr. 16, 2003.

El-Marakby et al., "Scalability Improvement of the Real Time Control Protocol", Computer Communications 28, Feb. 10, 2005, pp. 136-149.

Ott., "RTCP Extensions for Single-Source Multicast Sessions with Unicast Feedback", Intel, Mar. 5, 2007, pp. 2-58.

Search Report dated May 19, 2008.

* cited by examiner

METHOD FOR EFFICIENT FEEDBACK OF RECEIVING CHANNEL CONDITIONS IN ADAPTIVE VIDEO MULTICAST AND BROADCAST SYSTEMS

This application claims the benefit, under 35 U.S.C. §365 of International Application PCT/US2007/006014, filed 9 Mar. 2007, which was published in accordance with PCT Article 21(2) on 18 Sep. 2008, in English.

FIELD OF THE INVENTION

The present invention relates to video multicast and broadcast systems in general, and in particular, to efficient feedback of receiving channel conditions to a server in an adaptive video multicast and broadcast systems.

BACKGROUND OF THE INVENTION

In video multicast/broadcast applications, video data are transmitted from the video server to multiple receivers over wired and/or wireless networks. Herein, a "/" is used to indicate alternative names for the same or similar components. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

The media server includes, among other components, a video encoder/packetizer that generates a stream of video packets, and an application layer forward error correction (FEC) encoder that applies cross-packet FEC coding to the video packets for reliable transmission. The receivers of multicast or broadcast video may be connected to the server via various wired or wireless access links. Different receivers of the same video may experience different packet loss rates at the same time due to different channel conditions and the packet loss rate for a given receiver varies over time. The receiving quality at different receivers or the same receiver varies over time. Furthermore, receivers may leave or join the multicast group so that the topology of network changes. To achieve reliable and efficient broadcast and multicast operation and satisfy the quality of service (QoS) requirements of multiple video receivers, the video server needs to adapt video coding parameters (e.g. the bit rate, the intra-frame rate, the intra-block rate, the packet size, etc.) and application-layer FEC overhead according to the varying receiver topology and the receiving channel conditions of multiple receivers. This means that the receivers frequently feed their channel condition back to the video server.

The problem to be solved by the present invention is to how to provide the channel condition feedback from multiple receivers to the video server efficiently. An efficient channel feedback method is important for optimizing the design and operation of the adaptive video multicast/broadcast system where the video server dynamically adjusts the video encoding parameters and the FEC overhead to be added to protect the stream of video packets according to the receiving channel conditions of multiple video receivers.

In some reported systems, the standard Real-Time Transport Control protocol (RTCP) is used for the receivers to feed their receiving channel conditions back to a video server. However, in the standard RTCP protocol, each participant (sender or receiver) independently sends the RTCP sender reports or receiver reports (containing the receiving channel conditions) periodically to all participants in the session. There are several problems with this approach. First, this approach may introduce high overhead resulting in scalability issue when the number of receivers increases. Second, a small RTCP report interval is required for fast channel feedback. This approach is not efficient for one-to-many communications such as video multicast/broadcast because the server will suffer from feedback implosion. It is important to conserve the RTCP control bandwidth, especially in wireless networks, so that the sender/transmitter/server efficiently gets necessary information for effective adaptation of video coding parameters and FEC overhead.

The present invention solves the above problems by providing a method for efficient feedback of receiving channels conditions for multiple receivers in an adaptive video multicast/broadcast system.

SUMMARY OF THE INVENTION

In video multicast/broadcast applications, video data are transmitted from the video server to multiple receivers over wired and/or wireless networks. The media server includes, among other components, a video encoder/packetizer that generates a stream of video packets, and an application layer forward error correction (FEC) encoder that applies cross-packet FEC coding to the video packets for reliable transmission. The receivers of multicast or broadcast video may be connected to the server via various wired or wireless access links. Different receivers of the same video may experience different packet loss rates at the same time due to different channel conditions and the packet loss rate for a given receiver varies over time. The receiving quality at different receivers or the same receiver varies over time. Furthermore, receivers may leave or join the multicast group so that the topology of network changes. To achieve reliable and efficient broadcast and multicast operation and satisfy the quality of service (QoS) requirements of multiple video receivers, the video server needs to adapt video coding parameters (e.g. the bit rate, the intra-frame rate, the intra-block rate, the packet size, etc.) and application-layer FEC overhead according to the varying receiver topology and the receiving channel conditions of multiple receivers. This means that the receivers need to provide frequent channel condition feedback to the video server.

A method and apparatus for providing channel condition feedback in a multicast network are described including estimating a indication of channel condition, determining a receiver class based on the estimated indication of channel condition, calculating a delay, delaying transmission of the estimated indication of channel condition for the calculated delay, receiving a report from another receiver in the determined receiver class, the report including an indication of channel condition and canceling the delay if the received indication of channel condition is one of greater than and equal to the estimated indication of channel condition. The method and apparatus further include transmitting a single report for the calculated receiver class to a server including a worst indication of channel condition for the determined receiver class.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
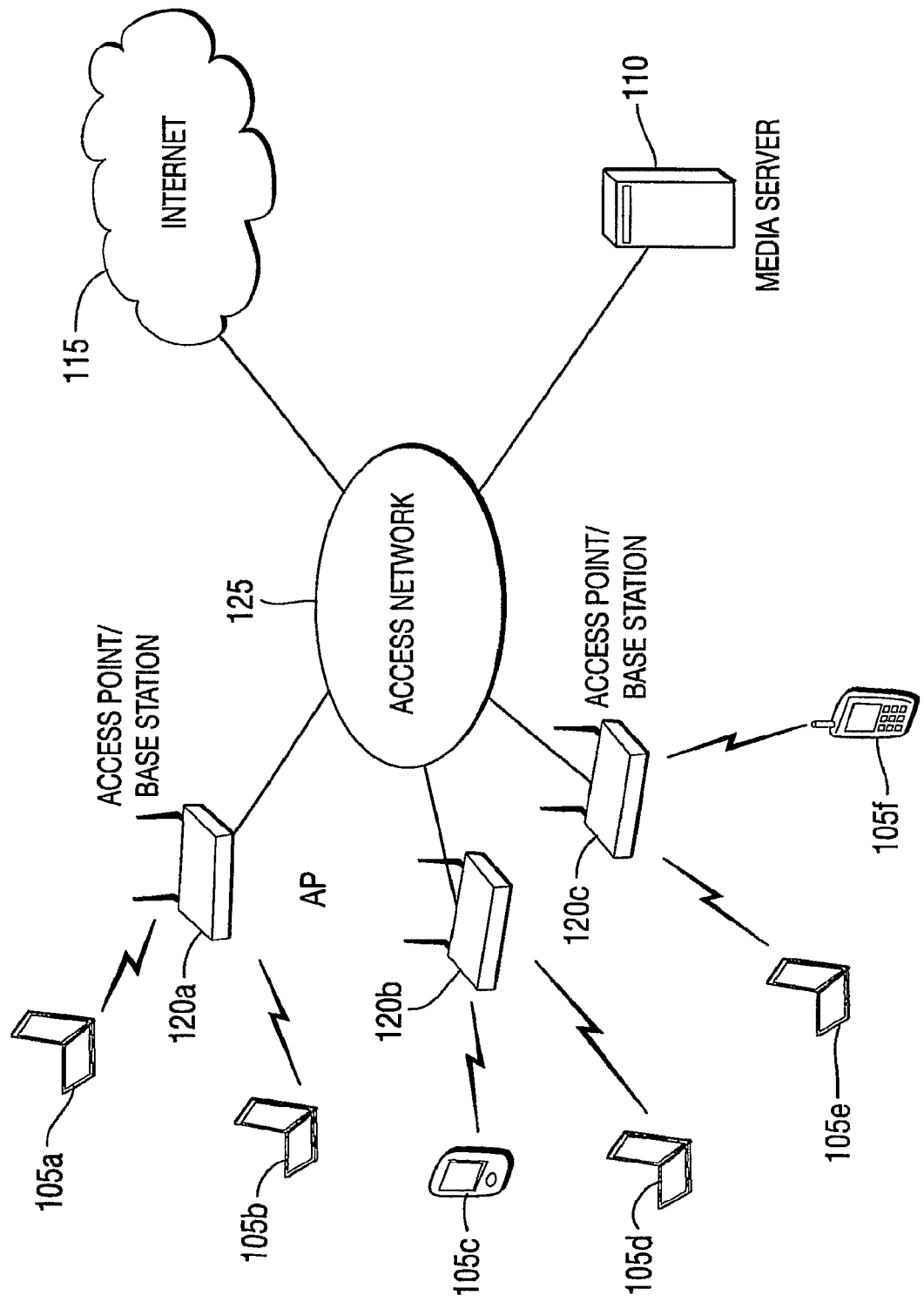
FIG. 1 is a schematic diagram of a network in accordance with the principles of the present invention.

Referring now to FIG. 1, an exemplary multicast/broadcast video system in accordance with the principles of the present invention is shown. While FIG. 1 depicts wireless devices only, the present invention can be used in wired line or wireless configurations or configurations including both wired line and wireless devices. It is noted that the RTCP control bandwidth in wireless environments is more critical. The wireless devices 105a, 105b, 105c, 105d, 105e and 105f are connected to a video multicast server 110 and the Internet 115 through wireless access points/base stations 120a, 120b and 120c and a high-speed wired access network (e.g. Ethernet) 125. The video server 110 multicasts one or more video programs over the high-speed wired network 125 to the wireless access points/base stations 120a, 120b and 120c. The access points/base stations 120a, 120b and 120c distribute the video to the wireless devices 105a-105f in multicast/broadcast over the wireless links between the wireless access points/base stations 120a-120c and the wireless devices 105a-105f. The users of the wireless devices 105a-105f can view one or more video programs and simultaneously access the Internet 115. The video server 110 dynamically adjusts the video encoding parameters and the FEC overhead added to protect the stream of video packets according to the receiving channel conditions of the multiple video receivers in order to achieve reliable and efficient broadcast and multicast operation and satisfy, the quality of service (QoS) requirements of the multiple video receivers. The present invention provides a method which efficiently provides feedback on the receiving channel conditions/packet loss rates of multiple video receivers so that the server can adapt the video coding parameter and FEC overhead. An efficient channel feedback method is important for optimizing the design and operation of the adaptive video multicast/broadcast system. It is noted that while the present invention is described in terms of a video packet stream, any digital stream including an audio stream could use the method of the present invention.

The present invention can be used in adaptive video multicast or broadcast applications over wireless (3G or wireless local area networks) or wired line networks, or hybrid wireless/wired line networks although the wireless networks are used as an example to describe the invention.

It is noted that the present invention provides rules by which the RTCP messages are sent. The RTCP control message format (i.e. sender report and receiver report) does not have to be altered.

In the present invention, receivers of a video packet stream are classified into different classes based on their packet loss rate. Let $0 \leq P_1 \leq P_2 \leq \ldots \leq P_{n-1} \leq P_n \leq \ldots \leq P_N \leq 1$ denote packet loss rate threshold of different receiver classes. If the packet loss rate of a receiver i at a time interval t is in the range $P_{n-1} < P_i(t) \leq P_n$, this receiver belongs to class n. A receiver can obtain the information about the packet loss rate thresholds for each class when it joins the video session, for example, through downloading the session description file or other available means. Based on the packet loss rate, the receiver knows to which class it belongs.

The feedback algorithm of the present invention is as follows.

The video server periodically multicasts the RTCP sender report to all the receivers at a time interval t.

Each receiver estimates its raw packet loss rate before any application-layer FEC recovery for each time interval t, 1. If the receiver's raw packet loss rate is less than $P_1$ i.e. $P_i(t) < P_1$, the receiver is currently a class 1 user. The receiver does not send the receiver report for this time interval because its packet loss rate is already low enough for good QoS. Note that $P_1 = 0$ is a special case. The server, therefore, does not make any adjustments for a receiver in class 1.

2. If the receiver's raw packet loss rate is between the class n thresholds, i.e. $P_{n-1} < P_i(t) \leq P_n$, ($N \geq n > 1$), the receiver is currently a class n receiver for this time interval. The class n receiver sends the receiver report to the video server for the adaptation of video coding parameters and FEC overhead. To reduce the feedback control traffic, a class n receiver may delay sending its own receiver report for a short period, depending on its calculated packet loss rate, i.e. the higher the packet loss rate, the smaller the delay. Specifically, the receiver with a packet loss rate in the range $P_{n-1} < P_i(t) \leq P_n$, delays sending its own receiver report for a delay period $$d = D \times \frac{P_n - P_i(t)}{P_n - P_{n-1}},$$

where $D \leq t$ is a constant delay with a default value of t/2. This delay effectively randomizes the time delay so that a receiver with a large packet loss rate sends its report first. The receiver reports are transmitted in multicast from the receiver to all the participants (video server and other receivers) in the session. Within the delay period, a class n receiver may receive the reports from another class n receiver. If such a receiver report received during the delay period carries a packet loss rate greater than the packet loss rate reported by it, this receiver will cancel its delay timer and will not send its receiver report for this reporting time interval t.

3. If the raw packet loss rate of a receiver is greater than the class N threshold, i.e., $P_i(t) > P_N$, the receiver is currently a class N+1 receiver. The class N+1 receivers do not send RTCP receiver reports since its packet loss rate is too high and the video server cannot meet their QoS requirements in this time interval. This does not mean that a receiver never sends a receiver report. It only means that as long as it is a class N+1 class receiver it does not send a receiver report because its QoS requirements cannot be met. The server, therefore, does not make any adjustments for a receiver in class N+1. Note that a special case is $P_N = 1$ The delay in the above step 2 can have other forms. As an example, in an alternative embodiment, the delay can be formulated as $$d = \left\lceil D \times \frac{P_n - P_i(t)}{(P_n - P_{n-1})T_o} \right\rceil \times T_0 + T_1$$

where $T_0$ is a constant and $T_1$ is a random number between 0 and $T_0$.

Although the report interval t is used to update the receiving channel condition by a receiver and adapt the video coding parameters and FEC overhead by the server, the algorithm itself does not require strict time synchronization between the server and receivers. If a receiver does not receive a sender report correctly, it can calculate the report time interval t using the previously received sender report.

In a special case, there is only one class, i.e. $0 \leq P(t) \leq 1$. All the receivers belong to this single class. Then step 2 as described above is used by all the receivers. That is, all receivers send their channel condition feedback according to step 2 above.

Figure 2:
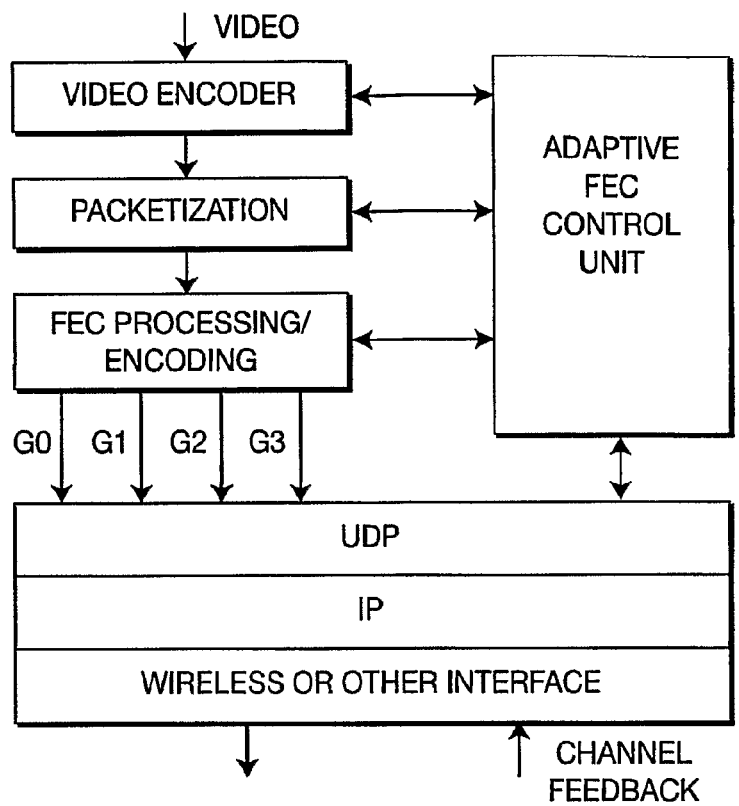
FIG. 2 is a block diagram illustrating a server with adaptive forward error correction.

Referring now to FIG. 2, which is a block diagram illustrating a server with adaptive FEC in accordance with the present invention. The video server includes the video/source encoder 205, a packetization unit 210, an FEC processing/encoding unit 215, an adaptive FEC control unit 220, and a UDP/IP protocol stack communication unit and interface (e.g., wireless) 225. The adaptive FEC control unit 220 generates the sender report, and receives and processes the receiving channel condition feedback (receiver reports) from multiple receivers. It determines the video coding parameters and FEC code overhead. The adaptive FEC control unit 220 instructs the video/source encoder 205, the packetization unit 210 and the FEC processing/encoding unit 215 to perform the video encoding, packetization and FEC encoding. The adaptive FEC control unit also communicates with and is in control of the UDP/IP communication unit 225 in order to transmit the video source packets and parity packets.

Figure 3:
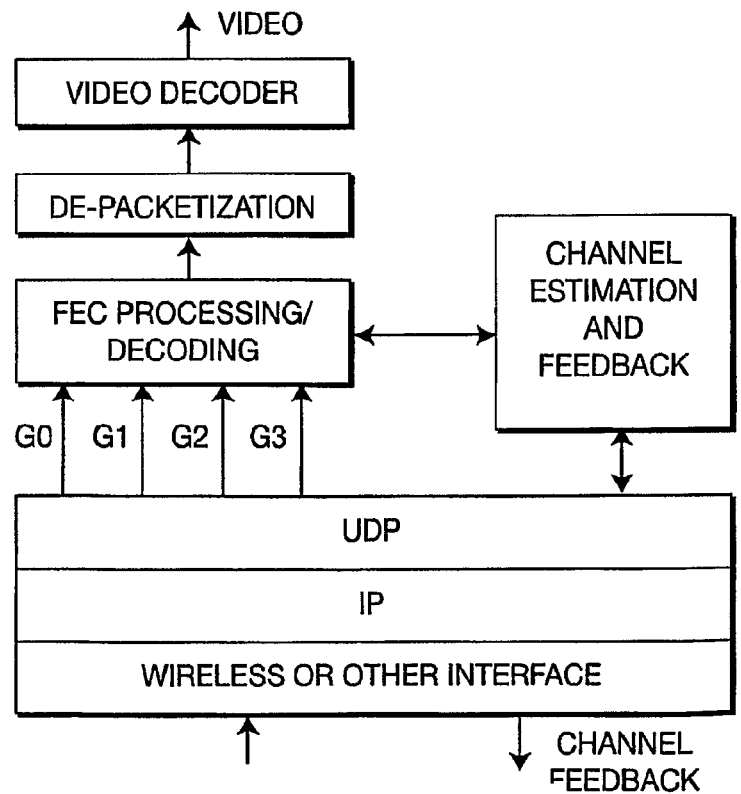
FIG. 3 is a block diagram illustrating the components at a receiver.

Referring now to FIG. 3, which is a block diagram illustrating the receiver components in accordance with the present invention. The receiver includes a video/source decoder 305, a de-packetization unit 310, a FEC processing/decoding unit 315, a channel estimation and feedback unit 320, and a UDP/IP protocol stack communication unit and interface (e.g., wireless) 325. The channel estimation and feedback unit 320 estimates the raw packet loss rate and sends the receiver report back to the video server using the method described above.

The video server components can be implemented on a single physical machine or on multiple machines connected by a network. The receiver components can also be implemented on a single physical machine or on multiple machines connected by a network.

Figure 4A:
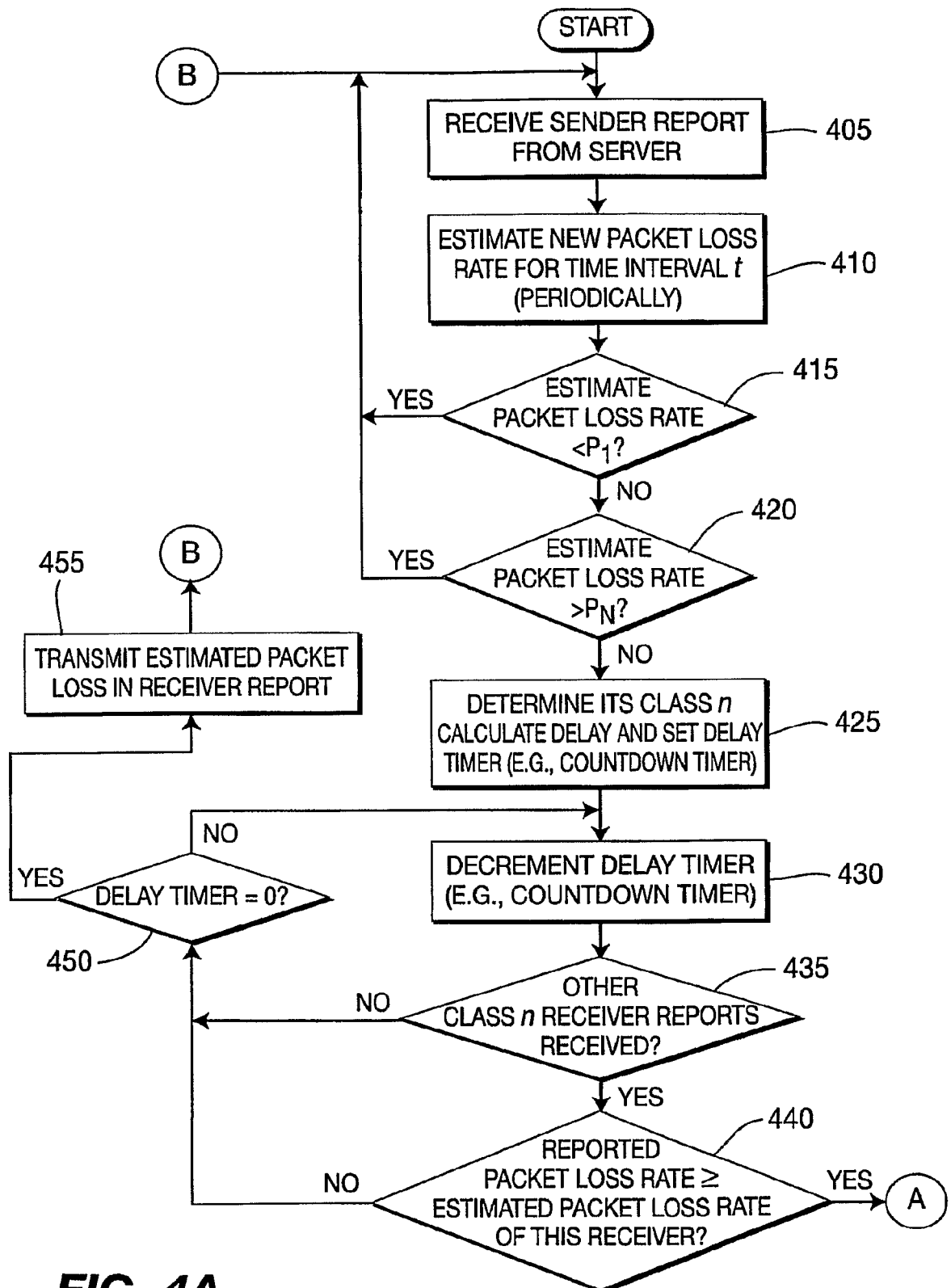
FIG. 4 is a flowchart of the feedback method of the present invention from the perspective of a receiver.
Figure 4B:
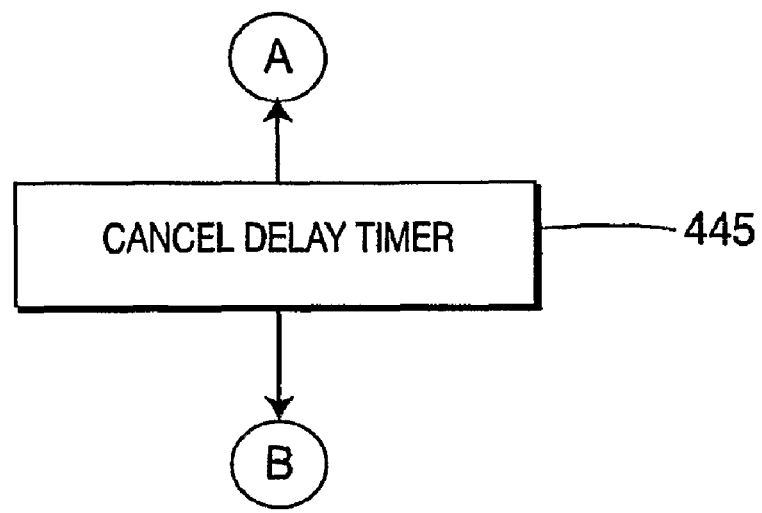

FIG. 4 is a flowchart of the feedback method of the present invention from the perspective of a receiver. At 405, a receiver receives a sender report from a (video) server. The receiver estimates its packet loss rate for a time interval t at 410. That is, the receiver estimates its packet loss rate periodically. A test is performed at 415 to determine if the estimated packet loss rate is less than a threshold $P_1$, which puts the receiver into class 1. In the case that the estimated packet loss rate is less than the threshold $P_1$, the estimated packet loss rate is not reported because the packet loss rate is already low enough that all QoS requirements are met and no adjustments are necessary by the (video) server. Adjustments include adaptation of the video coding parameters and application-layer FEC coding and overhead. If the receiver is in class 1, then the receiver waits to receive the next sender report at 405. It should be noted here that the receiver need not wait for the sender report to estimate its packet loss rate but can do so whenever convenient. If the receiver is not in class 1, then a test is performed at 420 to determine if the receiver's estimated packet loss rate is greater than a threshold $P_N$ that puts the receiver into class N+1. Receivers which have an estimated packet loss rate above the threshold $P_N$ will not report their estimated packet loss rates because the rates are so high that no adjustments that the (video) server could make would allow their QoS requirements to be met. If the receiver is in a class, based on its estimated packet loss rate that is above the threshold $P_N$, then the receiver returns to 405 to wait for the next sender report.

If the receiver is in a class, based on its estimated packet loss rate that is below the threshold $P_N$ and greater the threshold $P_1$, the receiver determines its class, calculates its delay for sending its receiver report and sets its delay timer at 425. The delay timer is decremented at 430. At test is then performed at 435 to determine if this receiver has received any reports from other receivers in its class. If this receiver has received reports from other receivers in its class then a test is performed at 440 to determine if the reports received from other receivers report higher estimated packet loss rates than the estimated packet loss rate of this receiver. If the reports received from other receivers report estimated packet loss rates greater than or equal to the estimated packet loss rate of this receiver, then at 445 the delay timer for this receiver is canceled and the receiver returns to 405 to wait for the next sender report. This is because only the receiver with the highest estimated packet loss rate for the receiver class needs to report its estimated packet loss rate. The receiver having the highest estimated packet loss rate will transmit its estimated packet loss rate to the (video) server. The server will then make adjustments according to the worst estimated packet loss rate reported to it for the class and thereby all receivers in the class should meet their QoS requirements. This importantly reduces the number of receiver reports that the (video) server needs to receive and process and correspondingly reduces the bandwidth requirements for receiver report transmissions. If the reports received from other receivers report lower estimated packet loss rates than the estimated packet loss rate of this receiver, then at 450 a test is performed to determine if the delay timer has expired. If the delay timer has not expired, then the receiver proceeds to 430 to decrement the delay timer. If the delay timer has expired (and no other report that is greater than or equal to estimated packet loss rates has been received) then this receiver transmits its estimated packet loss rate in its receiver report to the (video) server at 455 and then this receiver proceeds to 405 to wait for the next sender report.

Figure 5:
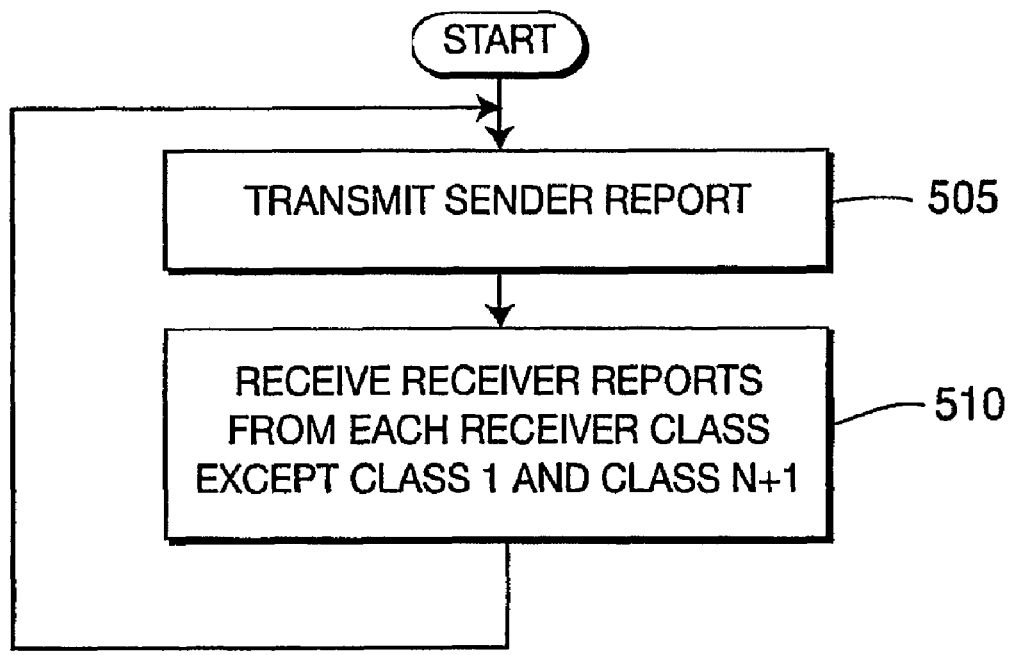
FIG. 5 is a flowchart of the feedback method of the present invention from the perspective of a (video) server.

FIG. 5 is a flowchart of the feedback method of the present invention from the perspective of a (video) server. At 505, the (video) server transmits a sender report to all receivers to which it is transmitting (video) data. At 510 the (video) server receives one receiver report from each receiver class except class 1 and class N+1.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for providing channel condition feedback in a multicast network, said method comprising:
    estimating an indication of channel condition;
    determining a receiver class based on said estimated indication of channel condition;
    calculating a delay;
    delaying transmission of said estimated indication of channel condition for said calculated delay;
    receiving a report from another receiver in said determined receiver class, said report including an indication of channel condition;
    canceling said delayed transmission based on a comparison between said received indication of channel condition and said estimated indication of channel condition; and
    transmitting a report including said estimated indication of channel condition if no report from another receiver was received.

2. The method according to claim 1, further comprising transmitting a report including said estimated indication of channel condition if said received indication of channel condition was less than said estimated indication of channel condition.

3. The method according to claim 1, further comprising:
    determining if said estimated indication of channel condition is below a threshold; and
    not transmitting a report including said estimated indication of channel condition if said estimated indication of channel condition is below said threshold.

4. The method according to claim 1, further comprising:
    determining if said estimated indication of channel condition is above a threshold; and
    not transmitting a report including said estimated indication of channel condition if said estimated indication of channel condition is above said threshold.

5. The method according to claim 1, further comprising receiving a report periodically from a server.

6. The method according to claim 1, wherein said estimated indication of channel condition is an estimated packet loss rate.

7. The method according to claim 1, wherein said received indication of channel condition is a received packet loss rate.

8. The method according to claim 1, wherein said estimated indication of channel condition is estimated periodically.

9. An apparatus for providing channel condition feedback in a multicast network, comprising:
    means for estimating a indication of channel condition;
    means for determining a receiver class based on said estimated indication of channel condition;
    means for calculating a delay;
    means for delaying transmission of said estimated indication of channel condition for said calculated delay;
    means for receiving a report from another receiver in said determined receiver class, said report including an indication of channel condition;
    means for canceling said delayed transmission based on a comparison between said received indication of channel condition and said estimated indication of channel condition; and
    means for transmitting a report including said estimated indication of channel condition if no report from another receiver was received.

10. The apparatus according to claim 9, further comprising means for transmitting a report including said estimated indication of channel condition if said received indication of channel condition is less than said estimated indication of channel condition.

11. The apparatus according to claim 9, further comprising:
    means for determining if said estimated indication of channel condition is below a threshold; and
    means for not transmitting a report including said estimated indication of channel condition if said estimated indication of channel condition is below said threshold.

12. The apparatus according to claim 9, further comprising:
    means for determining if said estimated indication of channel condition is above a threshold; and
    means for not transmitting a report including said estimated indication of channel condition if said estimated indication of channel condition is above said threshold.

13. The apparatus according to claim 9, further comprising means for receiving a report periodically from a server.

14. The apparatus according to claim 9, wherein said estimated indication of channel condition is an estimated packet loss rate.

15. The apparatus according to claim 9, wherein said received indication of channel condition is a received packet loss rate.

16. The apparatus according to claim 9, wherein said estimated indication of channel condition is estimated periodically.

* * * * *